United States Patent Office 3,101,176
Patented Aug. 20, 1963

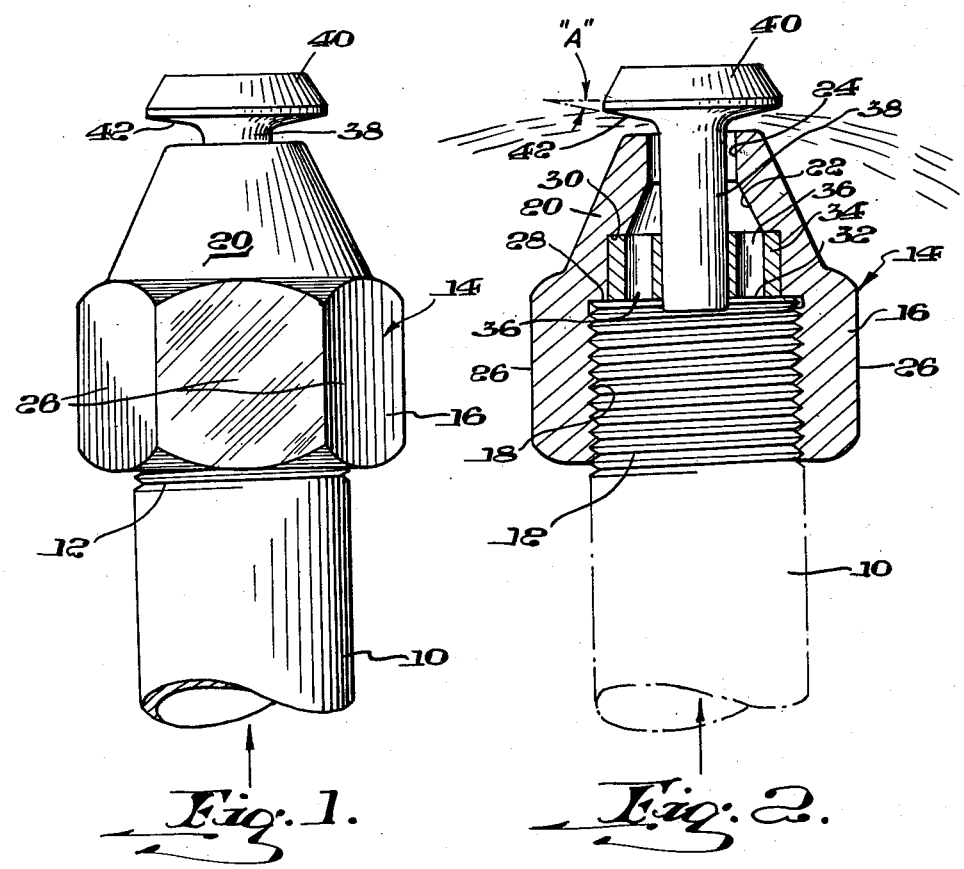

3,101,176
SPRINKLER DEVICE
Herbert C. Goss, 1932 Woodside Road, Glenshaw, Pa.
Filed Apr. 9, 1962, Ser. No. 186,613
2 Claims. (Cl. 239—524)

This invention relates to a sprinkler device which is usable for dividing a flow of water under pressure into a finely divided mist form and distributing such mist into a prescribed area for watering plant life. This proposed usage is illustrative of the utility of the invention and is not the sole usage to which my invention can be put.

This application is a continuation-in-part of my copending application Serial No. 138,348, now abandoned, filed September 15, 1961.

It is one of the objects of the invention to provide a watering device which will use the water supply pressure as the energy source for converting the laminar flow of water into finely divided droplets or mist which is then distributed uniformly over a prescribed area so that substantially all portions of the area receive uniform saturation. The invention is ideally suited for greenhouse, lawn and garden as well as general agriculture usage because the fine droplets of water, when settling, will not bend the foliage or damage the soil by furrowing or the like; instead, all areas are saturated uniformly so that each portion of the land covered is equally irrigated.

A further object of the invention is to utilize a minimum amount of the water energy for converting the water flow into a mist spray so that there is a substantial balance of energy for effecting the widest possible distribution of the spray. It is thus possible, with conventional urban water pressure to irrigate a substantial area of land.

It is a further object of the invention to convert the laminar flow of water always into a fine mist regardless of the water pressure so that even if the water pressure should change, the soil is always subjected to a mist and only the area of coverage will change.

In accordance with the invention, it has been found that the desired results outlined in the foregoing objects can be achieved only if the dimensions of the sprinkler fall within certain critical limits. In this respect, the sprinkler comprises an outlet nozzle forming a truncated conical configuration. Carried within the nozzle and coaxial with the orifice formed thereby is a stem which carries at its forward end a baffle which produces the desired umbrella spray. It has been found that in order to produce a fine mist, the radius of a fillet between the stem and baffle must be 3/64 inch, and furthermore the lower surface of the baffle must be disposed at an angle in the range of about 11 to 13 degrees with respect to a plane perpendicular to the axis of the nozzle and preferably 12 degrees. Furthermore, the diameter of the baffle should be in the range of about 2.50 to 3 times the diameter of the stem and preferably 2.75 times the diameter of the stem.

Other objects and features of the invention will become apparent from a consideration of the following description which proceeds with reference to the accompanying drawings, wherein:

FIGURE 1 is a side elevation view of a conduit having my invention installed thereon; and FIG. 2 is a section view taken through the center of the conduit and sprinkler device shown in FIG. 1.

Referring now to the drawings, there is shown in FIG. 1 a conduit or pipe 10 having threads 12 which are adapted for mounting a sprinkler designated generally by reference numeral 14. It should be understood, that the sprinkler device 14 is not limited in its usage to connection with the solid pipe 10, a flexible hose is also usable having a suitable male end provided with threads, snap-coupling or the like and adapted to form a water-tight connection with the sprinkler device 14.

The device 14 comprises a sleeve 16 having threads 18 which correspond with threads 12 and is of brass or the like construction to make it non-corrosive. A conical section 20 having an internal funnel surface 22 terminating at a discharge orifice 24 is constructed integrally with the sleeve 16. The outer surface of the sleeve has regularly constructed sides 26 to facilitate gripping thereof with a tool such as a wrench or the like and thereby turning the device 14 onto the threads 12. The interior of the device 14 includes two shoulders 28 and 30 which provide seats for the end 32 of the conduit 10 and an insert 34 which has a plurality of circularly-arranged through passages 36.

Mounted at the center of the insert 34 is a stem 38 which is supported by the insert 34 and has at its one end a barrier or baffle 40 with an annular impingement surface 42 which is located closely adjacent the orifice 24 to provide an impingement surface for the annular stream of water passing outwardly through the orifice 24. The annular impingement surface 42 is inclined at an angle "A" which is about 11° to 13° in magnitude to a plane perpendicular to the axis of the nozzle and preferably 12°. That is, the lower surface of the baffle must be in the range of 77° to 79° with respect to the flow of water through the nozzle and preferably 78°. It has been found that this angle is quite important in its effect on converting the laminar flow to the form of a fine mist best suited for irrigating. If this angle is varied substantially from the prescribed 11° to 13° range, then the mist changes to a coarser droplet not as well suited for the intended irrigating purposes.

Also found to have a critical effect on the quality of flow is the size of the radius connecting stem 38 with baffle 40; the ideal size radius is a 3/64 inch regardless of the dimensions of the nozzle. Furthermore, the diameter of the baffle 40 should be in the range of 2.5 to 3 times the diameter of the stem 38 and preferably 2.75 times the diameter of the stem. For example, in one embodiment of the invention which has been found to operate satisfactorily, the diameter of the baffle 40 was 11/16 inch and that of the stem 38, 1/4 inch.

When the water source is turned on, the flow of water through the conduit leads naturally to the distribution device 20 because of the pressure drop through the orifice 24 and the flow is converted from a laminar flow to a fine mist umbrella, uniformly and gently irrigating the soil in a circular area around the device 14.

The extent of the area can be controlled to some degree by adjusting the stem 38 upwardly or downwardly to vary the clearance between the annular surface 42 and the orifice 24.

The invention is not limited to locating the distributing device in the position shown in FIGS. 1 and 2. The device works equally well when it is turned 180° and is supported as a depending structure as well as a standard.

While the present invention has been described in connection with a single example embodiment thereof, it will be understood that this is exemplary of the invention and is in no sense restrictive thereof. It is reasonably to be expected that those skilled in the art can make numerous revisions and adaptations of the invention to suit individual design requirements and it is intended that such revisions and adaptations as incorporate the herein disclosed principles will be included within the scope of the following claims as equivalents of the invention.

I claim as my invention:

1. A sprinkler construction comprising a conduit having an end thereof adapted to form a water-tight connection, a sleeve fitting over the end of said conduit and including a complementary fastening secured to said conduit and having an outlet orifice therein, a positioning member disposed within said sleeve and held in fixed relation thereby, means providing a plurality of spaced through passages within said positioning member to disperse the flow within said conduit, means forming a constricting channel for directing the dispersed flow to said outlet orifice, a circular baffle disposed transversely to the flow of water emerging from said orifice and located at an angle in the range of 77° to 79° relative to the direction of flow in said channel to direct the flow outwardly and slightly upwardly in the form of a fine circular mist distribution, cylindrical stem means provided between said positioning member and said baffle to support said baffle at a predetermined elevation above said outlet orifice, the surface of the stem means communicating with the surface of the baffle through a $\frac{3}{64}$ inch radius, and the diameter of the baffle being in the range of 2.5 to 3 times the diameter of the stem means.

2. A water sprinkling device comprising coupling means for securing said device to a water source, means providing an outlet orifice for a flow of water from said source, an annular abutment surface spaced closely adjacent said outlet orifice and at an angle of substantially 78° to the direction of water flow to provide an impingement obstacle to said flow which is thereby divided into a fine mist upon striking thereagainst, a generally cylindrical stem for supporting said abutment surface and extending substantially parallel with said water flow, the surface of said cylindrical stem communicating with said annular abutment surface through a $\frac{3}{64}$ inch radius, and the diameter of the abutment surface being in the range of 2.5 to 3 times the diameter of the stem.

References Cited in the file of this patent

UNITED STATES PATENTS

| | | |
|---|---|---|
| 960,732 | Taylor | June 7, 1910 |
| 2,859,728 | Hobdy | Nov. 11, 1958 |
| 2,943,798 | Rienks | July 5, 1960 |
| 3,045,926 | Steinen | July 24, 1962 |

FOREIGN PATENTS

| | | |
|---|---|---|
| 786,972 | France | June 24, 1935 |